US010885223B2

(12) United States Patent
Angara et al.

(10) Patent No.: US 10,885,223 B2
(45) Date of Patent: Jan. 5, 2021

(54) SYSTEMS AND METHODS FOR ANONYMIZING USER ACCOUNTS

(71) Applicant: Symantec Corporation, Mountain View, CA (US)

(72) Inventors: SriHarsha Angara, Culver City, CA (US); Michael Lo, Culver City, CA (US); John Meehan, Culver City, CA (US); Srinivas Chillappa, Mountain View, CA (US); Simon Tiku, Culver City, CA (US); Viral Mehta, Culver City, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 183 days.

(21) Appl. No.: 15/836,505

(22) Filed: Dec. 8, 2017

(65) Prior Publication Data
US 2019/0180053 A1 Jun. 13, 2019

(51) Int. Cl.
*G06F 21/62* (2013.01)
*H04L 9/32* (2006.01)
*H04L 29/06* (2006.01)

(52) U.S. Cl.
CPC .......... *G06F 21/6254* (2013.01); *H04L 9/321* (2013.01); *H04L 63/0421* (2013.01)

(58) Field of Classification Search
USPC ............ 726/6, 2, 21, 36; 713/150, 163, 181; 380/255, 264, 276
See application file for complete search history.

(56) References Cited

U.S. PATENT DOCUMENTS

| | | | | |
|---|---|---|---|---|
| 2006/0056626 | A1* | 3/2006 | Keohane | G06F 3/04895 380/206 |
| 2012/0221421 | A1* | 8/2012 | Hammad | G06Q 10/00 705/16 |
| 2014/0304157 | A1* | 10/2014 | Bachenheimer | G06Q 20/4016 705/44 |
| 2015/0170175 | A1* | 6/2015 | Zhang | H04M 15/44 705/7.33 |
| 2015/0348083 | A1* | 12/2015 | Brill | G06Q 30/0222 705/14.23 |
| 2018/0165554 | A1* | 6/2018 | Zhang | G06K 9/6256 |

OTHER PUBLICATIONS https://dnt.abine.com/#help.
https://sudoapp.com/features/.

* cited by examiner

*Primary Examiner* — Sharif E Ullah
(74) *Attorney, Agent, or Firm* — FisherBroyles, LLP

(57) ABSTRACT

The disclosed computer-implemented method for anonymizing user accounts may include (i) receiving an instruction to anonymize a user account to protect a user's personally identifiable information, (ii) accessing, by a security program, a settings portal for the user account in response to receiving the instruction to anonymize the user account, (iii) replacing, by the security program, original values within at least two fields within the settings portal for the user account with anonymized values to mask the user's personally identifiable information, and (iv) storing the anonymized values within a protected vault to enable the user to login to the user account. Various other methods, systems, and computer-readable media are also disclosed.

20 Claims, 6 Drawing Sheets

Settings Portal
250

| Username 404 | John Smith |
|---|---|
| Email Address 406 | john.smith@email.com |
| Credit Card Number 408 | 4536 4387 3231 4421 |
| Billing Address 410 | 123 Apple Lane, Austin, Texas |

Settings Portal
250

| Username 404 | NetflixAccount567 |
|---|---|
| Email Address 406 | temp_forwarding567@email.com |
| Credit Card Number 408 | 3264 9685 4482 2247 |
| Billing Address 410 | PO Box 123, 10 Main St., Austin, Texas |

*FIG. 4*

SYSTEMS AND METHODS FOR ANONYMIZING USER ACCOUNTS

BACKGROUND

In modern times, an average Internet user has a number of accounts with existing online service providers (e.g., shopping, movies, and/or news websites, etc.). The Internet user may also optionally use a password manager. Each account on each of these websites could include sensitive or user-identifying information such as a username, password, first name, last name, credit card information, and/or an address, etc.

Some password managers offer solutions that make signing up for a website easy while also attempting to protect this sensitive information. First, some password managers may offer a masking service that will create an email alias that forwards to an original email inbox. Second, some password managers may offer a password generation service that will generate a random password for a particular website. Third, some password managers may further provide a "password changer" feature that automatically changes a user's password. Nevertheless, these related systems may still not optimize the protection of the user's sensitive or personally identifiable information along one or more dimensions, as discussed further below. The instant disclosure, therefore, identifies and addresses a need for systems and methods for anonymizing user accounts.

SUMMARY

As will be described in greater detail below, the instant disclosure describes various systems and methods for anonymizing user accounts. In one example, a computer-implemented method for anonymizing user accounts may include (i) receiving an instruction to anonymize a user account to protect a user's personally identifiable information, (ii) accessing, by a security program, a settings portal for the user account in response to receiving the instruction to anonymize the user account, (iii) replacing, by the security program, original values within at least two fields within the settings portal for the user account with anonymized values to mask the user's personally identifiable information, and (iv) storing the anonymized values within a protected vault to enable the user to login to the user account.

In one embodiment, the personally identifiable information may include (i) a username, (ii) a password, (iii) a name, (iv) a credit card number, and/or (v) an address. In some examples, the instruction to anonymize the user account includes a streamlined single-click instruction.

In one embodiment, the original values include a blank value and/or a default value. In some examples, the original values include a value originally set by the user upon registering the user account.

In one embodiment, the computer-implemented method may further include replacing, by the security program, an original value for a third field within the settings portal for the user account. In some examples, accessing, by the security program, the settings portal for the user account in response to receiving the instruction to anonymize the user account may include logging into the user account. In one embodiment, the security program references a login credential stored within the protected vault to login to the user account.

In some examples, the computer-implemented method may further include the security program generating the anonymized values. In one embodiment, the security program generates the anonymized values in response to receiving the instruction to anonymize the user account.

In one embodiment, a system for implementing the above-described method may include (i) a reception module, stored in memory, that receives an instruction to anonymize a user account to protect a user's personally identifiable information, (ii) an accessing module, stored in memory, that accesses, as part of a security program, a settings portal for the user account in response to receiving the instruction to anonymize the user account, (iii) a replacement module, stored in memory, that replaces, as part of the security program, original values within at least two fields within the settings portal for the user account with anonymized values to mask the user's personally identifiable information, (iv) a storing module, stored in memory, that stores the anonymized values within a protected vault to enable the user to login to the user account, and (v) at least one physical processor configured to execute the reception module, the accessing module, the replacement module, and the storing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive an instruction to anonymize a user account to protect a user's personally identifiable information, (ii) access, by a security program, a settings portal for the user account in response to receiving the instruction to anonymize the user account, (iii) replace, by the security program, original values within at least two fields within the settings portal for the user account with anonymized values to mask the user's personally identifiable information, and (iv) store the anonymized values within a protected vault to enable the user to login to the user account.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a block diagram of an example graphical user interface.

Figure 1:
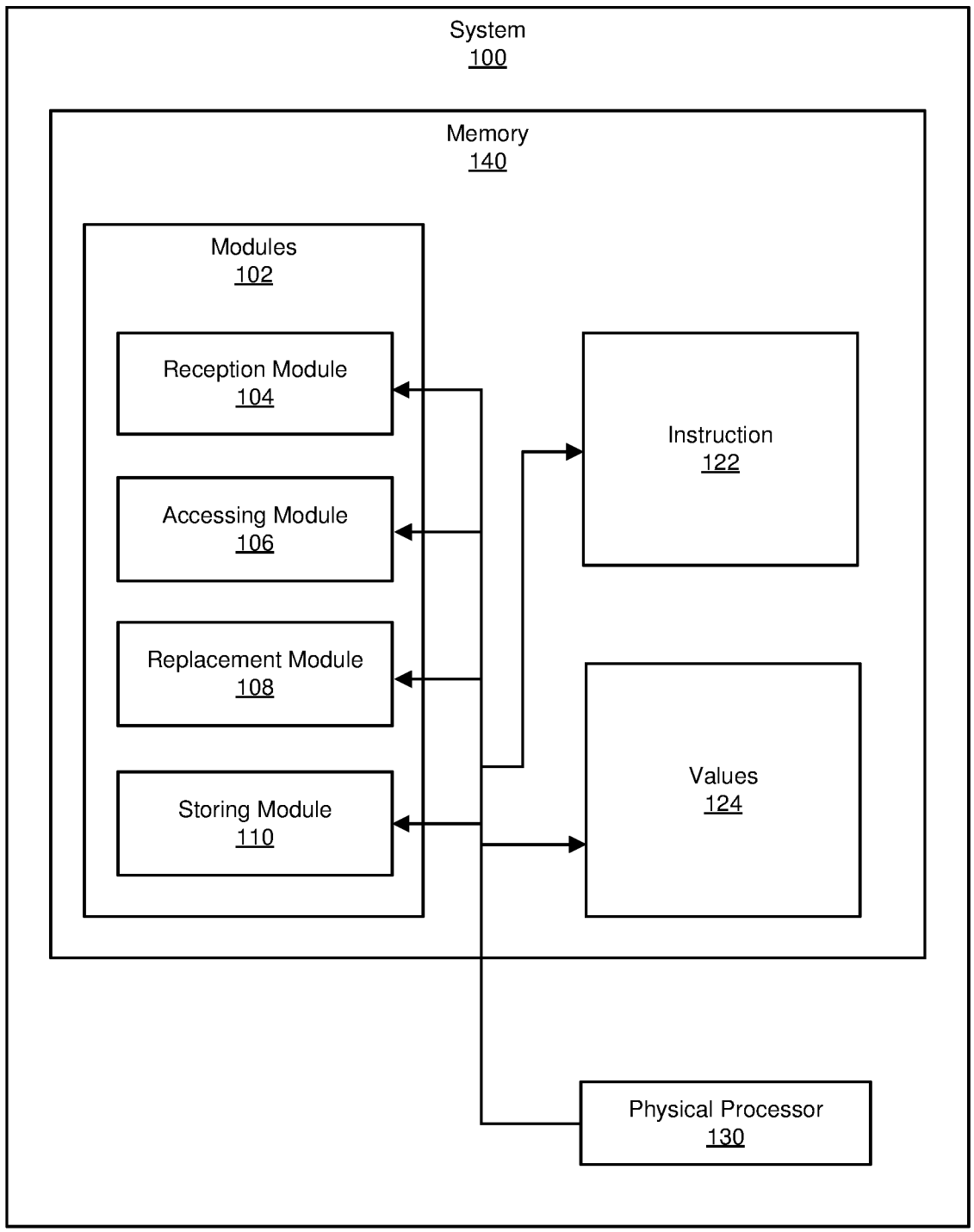
FIG. 1 is a block diagram of an example system for anonymizing user accounts.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for anonymizing user accounts. As described further below, the disclosed systems and methods may improve upon techniques for protecting a user's sensitive or personally identifiable information. Additionally, the disclosed systems and methods may also provide a streamlined one-click instruction for collectively logging into a user account, accessing a settings portal within the user account, optionally generating one or more anonymized values, and/or replacing one or more original values with the anonymized values, or any suitable permutation of these in accordance with method 300 described further below.

Figure 2:
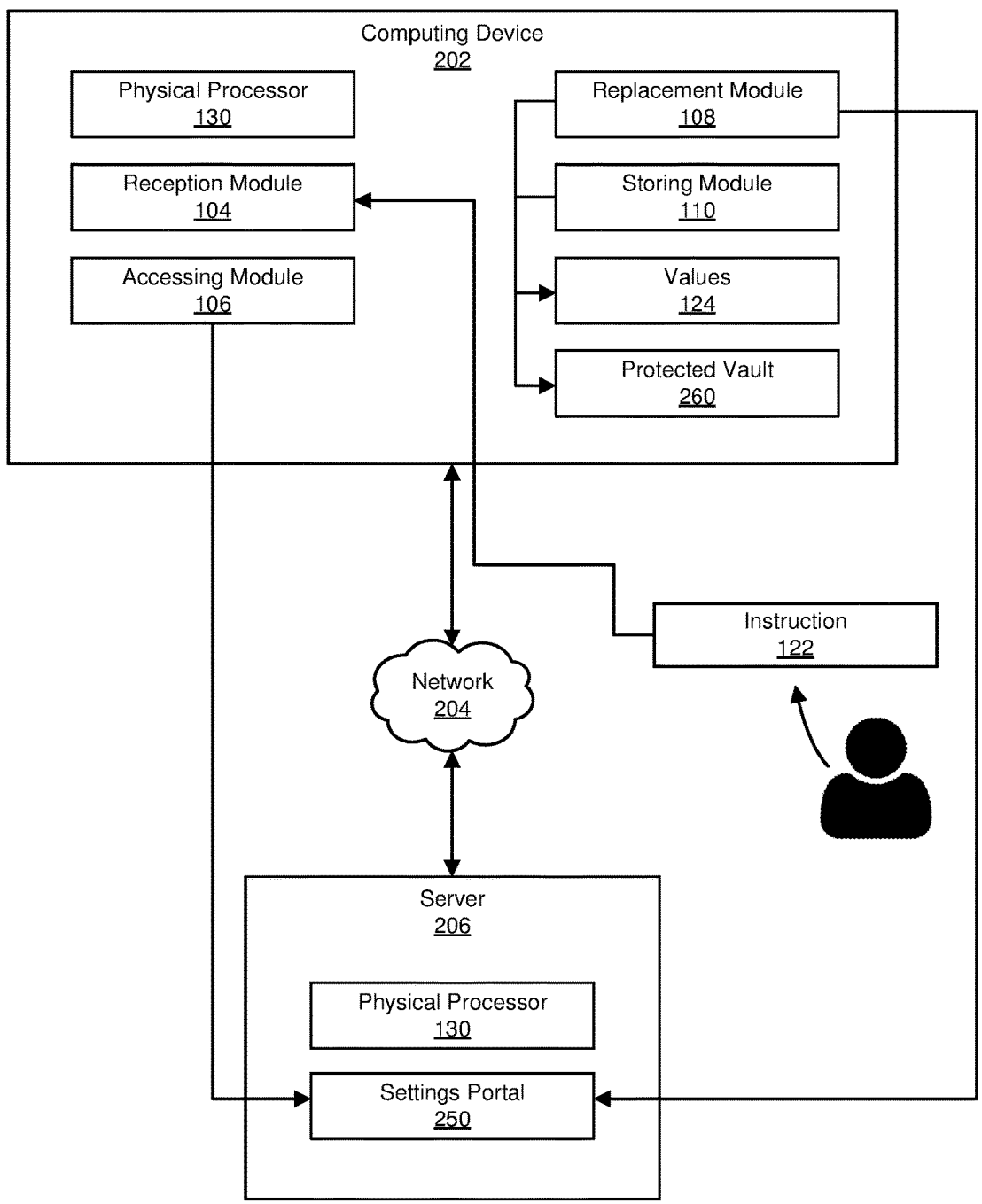
FIG. 2 is a block diagram of an additional example system for anonymizing user accounts.

The following will provide, with reference to FIGS. 1-2, detailed descriptions of example systems for anonymizing user accounts. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for anonymizing user accounts. As illustrated in this figure, example system 100 may include one or more modules 102 for performing one or more tasks. For example, and as will be explained in greater detail below, example system 100 may include a reception module 104 that receives an instruction 122 to anonymize a user account to protect a user's personally identifiable information. Example system 100 may additionally include an accessing module 106 that accesses, as part of a security program, a settings portal for the user account in response to receiving instruction 122 to anonymize the user account. Example system 100 may also include a replacement module 108 that replaces, as part of the security program, original values within at least two fields within the settings portal for the user account with anonymized values to mask the user's personally identifiable information. The original values and/or the anonymized values may be included within a set of values 124 stored in memory, as further shown in FIG. 1. Example system 100 may additionally include a storing module 110 that stores the anonymized values within a protected vault to enable the user to login to the user account. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate anonymizing user accounts. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to anonymize user accounts.

For example, and as will be described in greater detail below, reception module 104 may receive instruction 122 to anonymize a user account to protect a user's personally identifiable information. Accessing module 106 may access, as part of a security program, a settings portal 250 for the user account in response to receiving instruction 122 to anonymize the user account. Replacement module 108 may replace, as part of the security program, original values (e.g., within values 124) within at least two fields within settings portal 250 for the user account with anonymized values (e.g., within values 124) to mask the user's personally identifiable information. Storing module 110 may store the anonymized values within a protected vault 260 to enable the user to login to the user account.

Computing device 202 generally represents any type or form of computing device capable of reading computer-executable instructions. In one illustrative embodiment, computing device 202 may correspond to a customer or client-side computing device that is protected by a security vendor or product, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. In one illustrative embodiment, server 206 corresponds to a backend web server that provides a web service that includes the user account. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
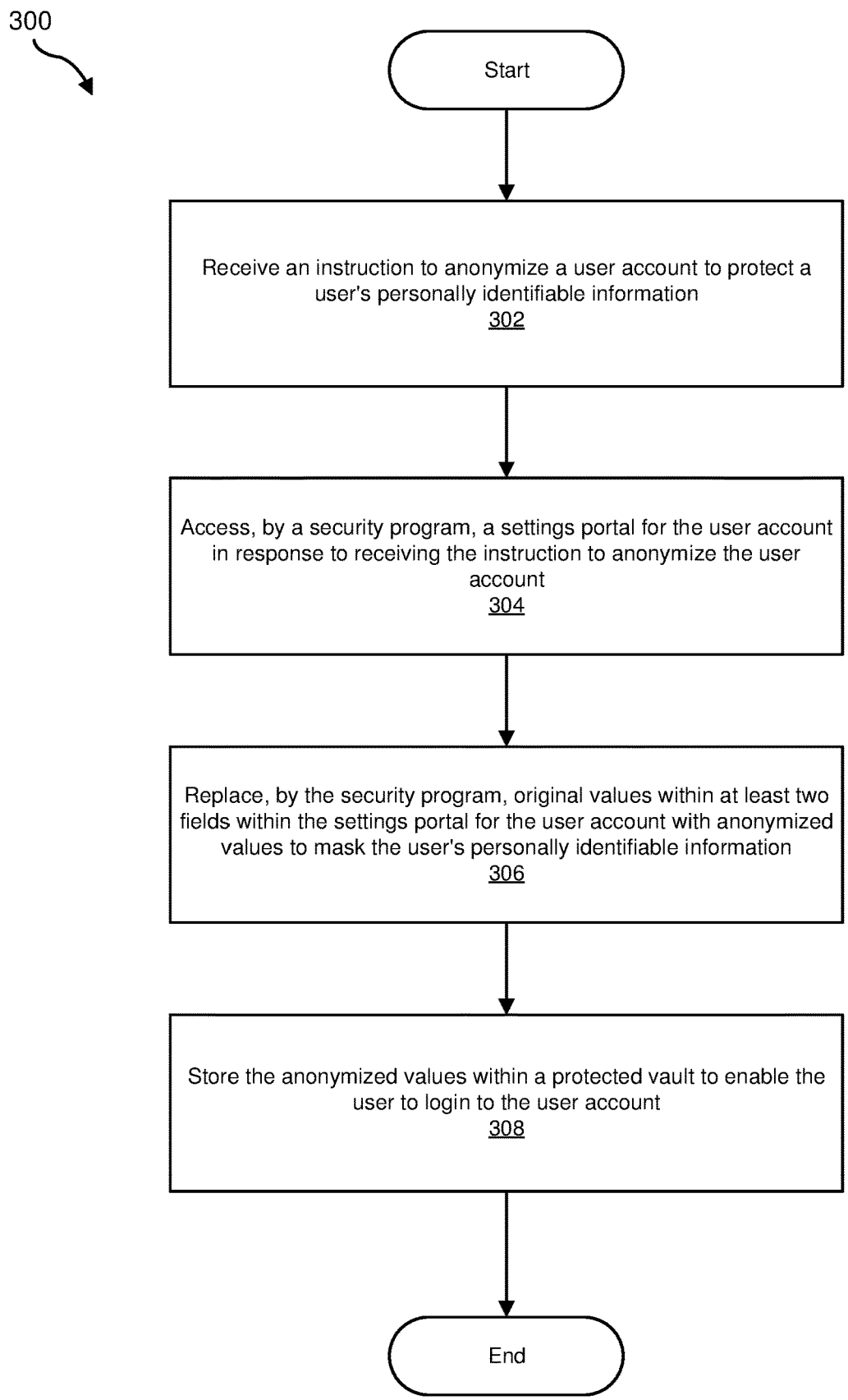
FIG. 3 is a flow diagram of an example method for anonymizing user accounts.

FIG. 3 is a flow diagram of an example computer-implemented method 300 for anonymizing user accounts. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive an instruction to anonymize a user account to protect a user's personally identifiable information. For example, reception module 104 may, as part of computing device 202 in FIG. 2, receive instruction 122 to anonymize a user account to protect a user's personally identifiable information. As used herein, the term "instruction to anonymize a user account" generally refers to any instruction or command that triggers the autonomous partial or complete anonymizing of a user account (e.g., without further necessary manual intervention) by a security program, as discussed further below. Moreover, as used herein, the term "personally identifiable information" generally refers to any private or public information that is specific to a particular person in a manner that potentially identifies that person. Illustrative examples of personally identifiable information include login credentials, a username, a password, challenge response questions and/or answers, a Social Security number, a credit card number, a credit card expiration date, a credit card security code, a phone number, and/or one or more fields of a residential or commercial mailing address.

Reception module 104 may receive the instruction in a variety of ways. In some examples, reception module 104 may receive the instruction in response to a user clicking a key on a keyboard or an input device such as a mouse. The user that issues the instruction may correspond to the user of the user account and/or a different user, such as an administrator.

In some examples, reception module 104 may receive a multitude of different instructions, or input items, as part of a multi-step process for anonymizing the user account. For example, a wizard may guide the user through a multi-step process for identifying the user account, indicating the instruction to anonymize the user account, and specifying one or more additional settings relating to how the user account is anonymized (e.g., which specific values will be anonymized, a timing of performing the anonymizing, etc.).

Alternatively, in some examples, reception module 104 may receive a streamlined single-click instruction to anonymize the user account. As used herein, the term "streamlined single-click instruction" generally refers to a streamlined method by which a user may trigger the entire process of performing the partial or complete anonymizing of the user account by issuing a single click instruction through a keyboard or other input device such as a mouse. For example, the user may identify a button within a graphical user interface, which is displayed in a manner indicating that the button will trigger the anonymizing of the user account, and upon clicking this button, the security program may perform the entire process of anonymizing the user account, as discussed further below.

In additional examples, reception module 104 may receive the instruction to anonymize the user account after first checking whether the user has a user account with a corresponding service. For example, reception module 104 may reference, or inspect, protected vault 260 to verify whether the user has a user account with a specific service. Upon verifying that the user does have a user account, reception module 104 may further prompt the user about whether the user would like to anonymize the user account. Accordingly, in these examples, reception module 104 may receive the instruction to anonymize the user account in response to issuing this prompt.

At step 304, one or more of the systems described herein may access, as part of a security program, a settings portal for the user account in response to receiving the instruction to anonymize the user account. For example, accessing module 106 may access, as part of a security program, settings portal 250 for the user account in response to receiving the instruction to anonymize the user account. As used herein, the term "security program" generally refers to a program that performs a security function to anonymize user accounts, as discussed further below. Moreover, as used herein, the term "settings portal" generally refers to any portion of a website, or other display from a service that provides the user account, where settings may be configured, as discussed further below.

In one illustrative example, the security program may correspond to a third-party security program that performs the anonymizing of the user account, as distinct from the user himself or herself performing the anonymizing (e.g., beyond issuing the instruction to perform the anonymizing, as discussed above in connection with step 302), and as distinct from the service itself performing the anonymizing. For example, the security program may correspond to a third-party security product provided by a security vendor, such as SYMANTEC CORPORATION. The security program may autonomously login to the user account, access the settings portal, generate one or more anonymized values, and/or replace one or more original values with the anonymized values (or any suitable permutation of these in accordance with method 300), as discussed further below. In this manner, the security program may function as an autonomous bot that effectively automates functionality that a user otherwise manually performs when accessing the web service, such as navigating to the web service, logging into the web service, entering user credentials (e.g., accessing module 106 may reference user credentials that are stored within protected vault 260), navigating through different portions within the web service, entering input within one or more fields of a webpage or other items displayed by the web service, and/or concluding the web session. As used herein, the term "protected vault" generally refers to a portion of computing memory that is protected by a feature, such as encryption and/or password protection, to keep the information within the protected vault secure. In illustrative examples, the security program and/or the protected vault may correspond to a password manager that stores, protects, manages, and/or maintains a multitude of distinct passwords for different user accounts (e.g., different user accounts of the same user for different services or websites). In general, the security program may correspond to some or all of modules 102 within system 100 and/or system 200.

Accessing module 106 may access the user account in a variety of ways. As first discussed above, accessing module 106 may automate all, or part, of the process of anonymizing the user account, including the steps of navigating to the web service (or other service providing the user account), accessing credentials for logging into the web service, using the credentials to login to the user account, navigating to the settings portal, identifying one or more fields as targets for replacement values (as discussed further below), populating the one or more fields with the anonymized values as replacement values, saving the results of these operations after replacing the original values with replacement values, and/or concluding the user session or logging out of the user account. In some examples, accessing module 106 may reference a predefined template, or heuristic, that informs accessing module 106 about how to navigate to the service, website, and/or application, login to the user account, navigate to one or more locations within the display or website, parse the different fields of the display or website, populate one or more fields as targets for replacement values, save the results of these operations, and/or logout of the user account. The predefined template or heuristic may be customized or personalized based on the specific format of the service that provides the user account.

At step 306, one or more of the systems described herein may replace, as part of the security program, original values within at least two fields within the settings portal for the user account with anonymized values to mask the user's personally identifiable information. For example, replacement module 108 may replace, as part of the security program, original values within at least two fields within settings portal 250 for the user account with anonymized values to mask the user's personally identifiable information. As used herein, the term "anonymized values" and the phrase "mask the user's personally identifiable information" generally refer to replacing the original values with values such that the original values (or other personally identifiable information of the user) are protected as private (e.g., because the original values cannot be derived from the anonymized values). More specifically, the term "anonymized values" as used herein may generally refer to values that have been configured in a manner that provides a level of anonymity for the user to protect the user's personally identifiable information. For example, the anonymized values may be random or pseudorandom, thereby disguising the user's personally identifiable information.

Replacement module 108 may replace the original values with the anonymized values in a variety of ways. For example, replacement module 108 may replace the original values with anonymized values at least in part by generating the anonymized values. In addition to generating the anonymized values, replacement module 108 may also generate corresponding accounts, such as an email account, a mailing or PO Box account, and/or a credit card account (e.g., a refill or one-time-use credit card account). Replacement module 108 may generate these corresponding accounts in coordination with one or more corresponding institutions, such as an email service provider, a mailing service provider, and/or a financial account or credit card provider (e.g., through their corresponding websites or application interfaces). Alternatively, replacement module 108 may simply prompt the user or administrator to generate one or more of these corresponding accounts.

Replacement module 108 may generate the anonymized values in response to reception module 104 receiving the instruction to anonymize the user account. Alternatively, replacement module 108 may generate the anonymized values prior to reception module 104 receiving the instruction to anonymize the user account. For example, replacement module 108 may generate the anonymized values according to a predefined schedule and/or generate the anonymized values as part of a prefatory stage to build up a reserve of one or more anonymized values with the expectation that these anonymized values may be used later upon receiving instruction 122.

In some examples, replacement module 108 may replace the original values with the anonymized values at least in part by navigating a cursor to access the settings portal within the service that provides the user account. Within the settings portal, replacement module 108 may further navigate the cursor to a field that includes one or more original values. The original values may correspond to blank, empty, and/or default values. Alternatively, the original values may correspond to values that the user originally set upon registering with the service. For example, the original values may optionally include the user's personally identifiable information, and the user may have entered this personally identifiable information upon registering with the service.

Upon navigating to one of the fields within the settings portal, replacement module 108 may enter input that deletes or overrides the original value and/or inserts the anonymized value as a replacement. FIG. 4 shows an example graphical user interface that illustrates how replacement module 108 may replace one or more original values with corresponding anonymized values as replacements. This figure may include two different instances of settings portal 250. Both instances of settings portal 250 include four separate fields, a username 404, an email address 406, a credit card number 408, and/or a billing address 410. These four separate fields are merely illustrative, and settings portal 250 may include any suitable permutation of fields for entering a user's personally identifiable information and/or corresponding anonymized values, including any of the examples of personally identifiable information listed above.

As further shown at the top of this figure, the top instance of settings portal 250 includes original values for these four separate fields that correspond to a user's personally identifiable information. In other words, the top instance of settings portal 250 shows how the four separate fields have been populated with the user's actual username, the user's actual email address, the user's actual credit card number, and the user's actual billing address. These original values may be "actual" instances of personally identifiable information in the sense that they correspond to values that the user primarily uses and/or keeps protected as sensitive items of information, as distinct from anonymized values that may replace and/or mask these values. Alternatively, the separate fields within the top instance of settings portal 250 in FIG. 4 may simply include blank, empty, and/or default values, as further discussed above.

In contrast, the bottom instance of settings portal 250 within FIG. 4 shows how the original values within the top instance of settings portal 250 have been replaced by replacement module 108 with corresponding anonymized values. As shown in this figure, the anonymized values may correspond to the original values in the sense that they match the appropriate structure or format for the corresponding fields. For example, the anonymized value for email address 406 has the format of an email address and the anonymized value for credit card number 408 has the format for a credit card number. Moreover, these values may be anonymized in the sense that they protect, mask, and/or disguise the user's personally identifiable information, because they do not reveal this information and/or the original values that populated the four separate fields.

In general, the anonymized values may correspond to values for addresses, or other items of information, that forward to the original values. For example, the anonymized value for email address 406 may designate an anonymous email address that has been configured to forward to the original email address of the user. Similarly, the anonymized value for credit card number 408 may designate a temporary, and/or linked, anonymous credit card number that draws upon the account for the original credit card number of the user or draws upon a bank account directly. The anonymized credit card number may include a refill and/or one-time-use credit card number. Additionally, the anonymized value for billing address 410 may designate an anonymous mailing address that has been configured to forward mail, or billing instructions, to the original billing address of the user.

In some examples, the anonymized values may be anonymized in the sense that they are specific to, or unique to, the specific user account and/or corresponding service that provides the user account. For example, the anonymized value for username 404 within the graphical user interface of FIG. 4 refers to "Netflix" based on the anonymized value being generated to populate a corresponding field within a settings portal within the NETFLIX web service or application. Additionally or alternatively, the anonymized values may be anonymized in the sense that all, or part, of the anonymized values may be random. For example, the anonymized values for username 404 and email address 406 within the graphical user interface of FIG. 4. include the random numerical string "567," which may be specific to, or unique to, the specific user account and/or the service that provides the user account, thereby distinguishing these anonymized values from other anonymized values that may be used for user accounts on other services.

Additionally or alternatively, the anonymized values may be anonymized in the sense that they are specific to, or unique to, a generated persona that provides a disguised substitute identity for the user. For example, each of the anonymized values within the graphical user interface of FIG. 4 may correspond to a single persona. In some examples, the single persona may be unique to a specific service or domain, such as NETFLIX. Alternatively, in other examples a persona may be mapped to multiple services or domains.

At step 308, one or more of the systems described herein may store the anonymized values within a protected vault to enable the user to login to the user account. For example, storing module 110 may, as part of computing device 202 in FIG. 2, store the anonymized values within protected vault 260 to enable the user to login to the user account.

Storing module 110 may store the anonymized values within the protected vault in a variety of ways. In general, storing module 110 may store the anonymized values within the protected vault at least in part by triggering one or more protection mechanisms to protect these items of information within the protected vault, such as encryption protection and/or password protection, as further discussed above. In general, the security program and/or protected vault may correspond to a password manager. Storing module 110 may store the anonymized values within the protected vault at least in part by overwriting the original values. Optionally, storing module 110 may also maintain a separate record of the original values for historical reference purposes.

As discussed above, the disclosed systems and methods may improve upon techniques for protecting a user's sensitive or personally identifiable information. Additionally, the disclosed systems and methods may also provide a streamlined one-click instruction for collectively logging into a user account, accessing a settings portal within the user account, optionally generating one or more anonymized values, and/or replacing one or more original values with the anonymized values, or any suitable permutation of these in accordance with method 300.

Figure 5:
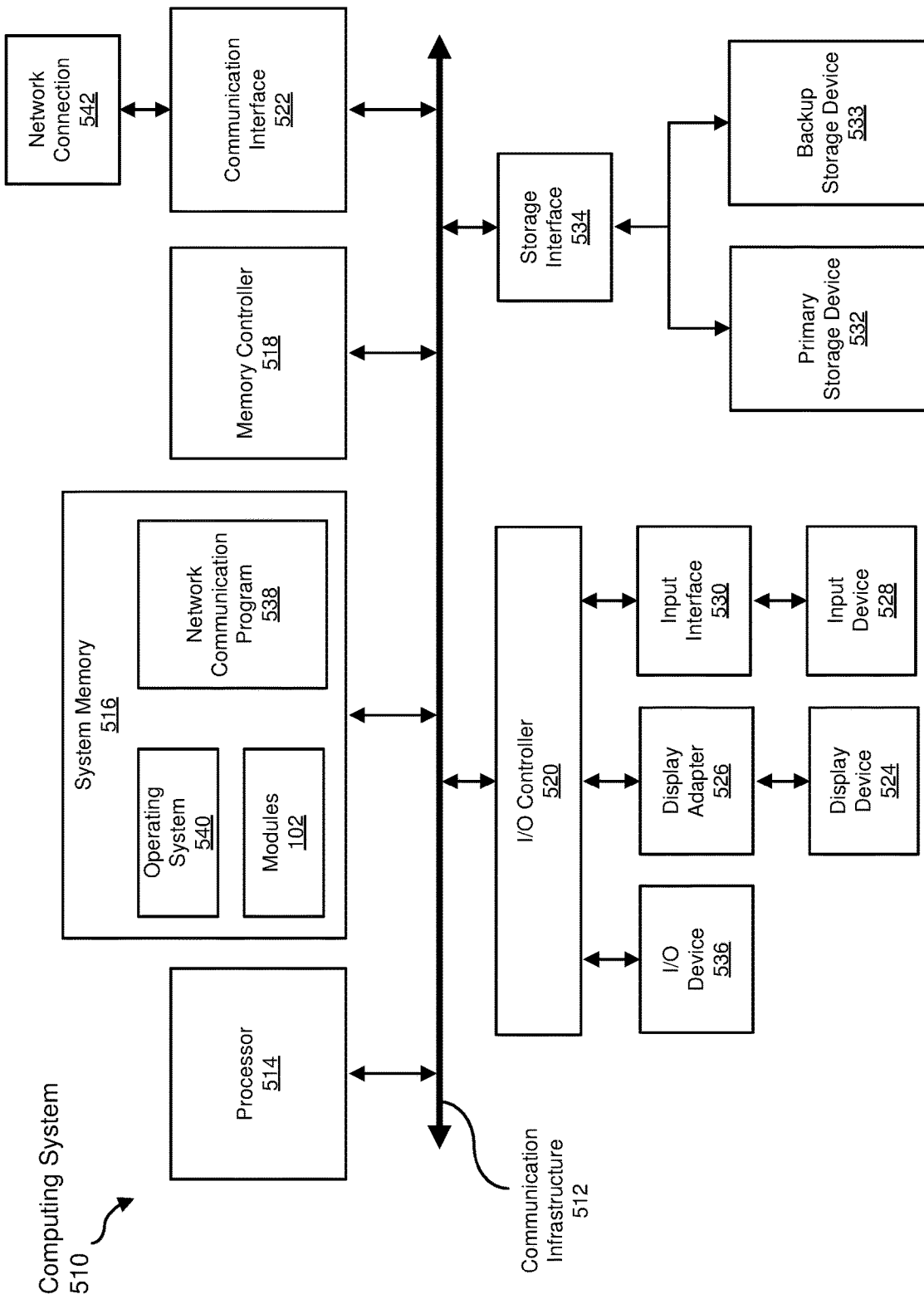
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
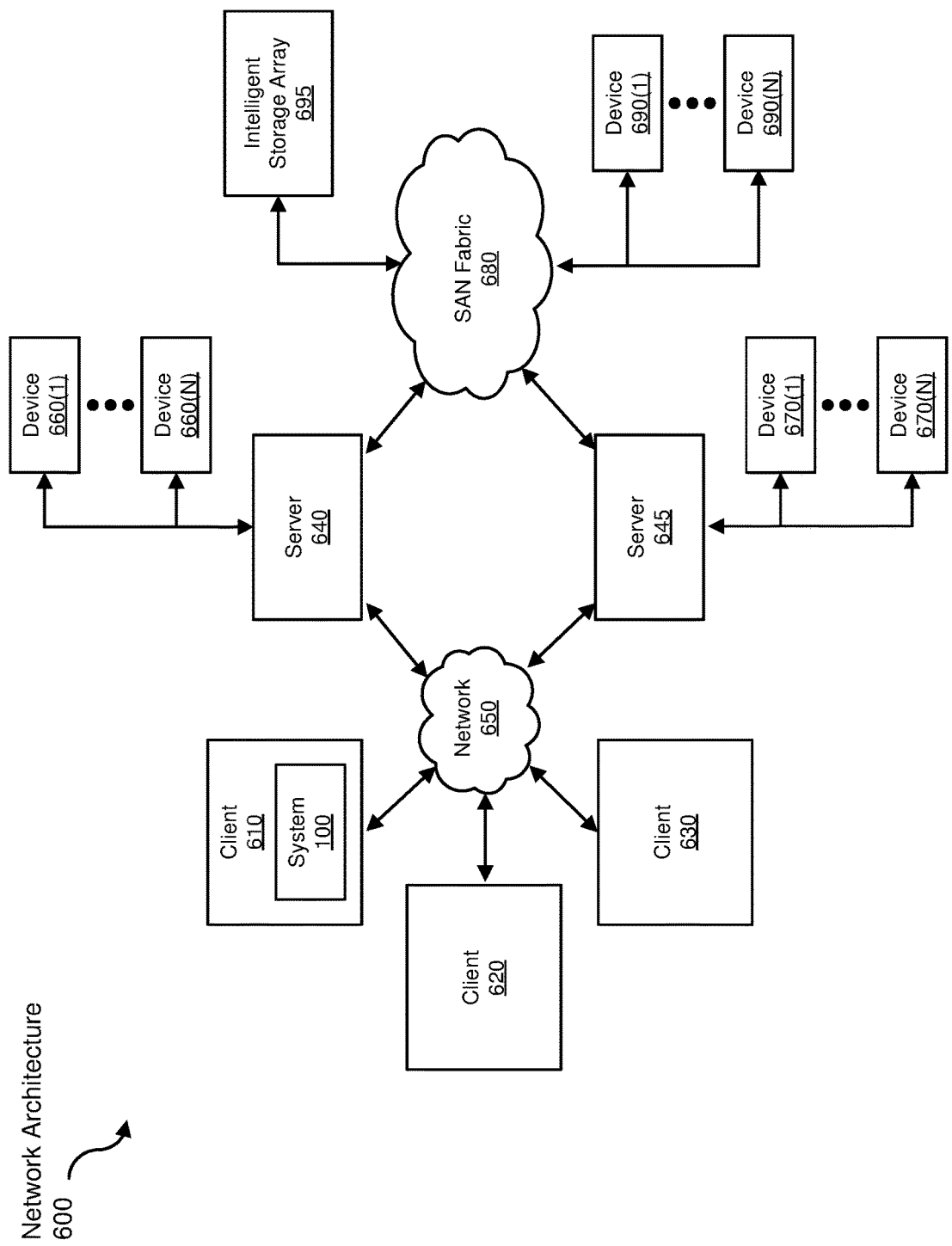
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for anonymizing user accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform data by generating an anonymized value to replace an original value, as discussed further above in connection with method 300 of FIG. 3. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for anonymizing user accounts, at least a portion of the method being performed by a computing device comprising at least one processor, the method comprising:
receiving an instruction to anonymize a user account to protect a user's personally identifiable information at least in part by receiving a streamlined single-click instruction to complete an entire process of anonymizing the user account;
accessing, by a security program in response to receiving the streamlined single-click instruction to complete the entire process of anonymizing the user account, a settings portal for the user account at least in part by the security program autonomously navigating to a website for the settings portal for the user account and the security program using credentials to login to the user account at the website, the security program comprising a third-party security program that is distinct from a specific service that includes the user account;
replacing, by the security program in response to receiving the streamlined single-click instruction to complete the entire process of anonymizing the user account, original values within at least two fields within the settings portal for the user account with anonymized values to mask the user's personally identifiable information; and
storing the anonymized values within a protected vault to enable the user to login to the user account;
wherein the security program accesses the settings portal for the user account at least in part by referencing a predefined template that informs the security program about how to navigate to the website and how to parse the at least two fields of the website.

2. The computer-implemented method of claim 1, wherein the security program accesses the settings portal for the user account at least in part by referencing the predefined template that informs the security program about:
how to login to the user account;
how to populate the fields; and
how to logout of the user account.

3. The computer-implemented method of claim 1, wherein the original values comprise a blank value.

4. The computer-implemented method of claim 1, wherein the original values comprise a default value.

5. The computer-implemented method of claim 1, wherein the original values comprise a value originally set by the user upon registering the user account.

6. The computer-implemented method of claim 1, further comprising replacing, by the security program, an original value for a third field within the settings portal for the user account.

7. The computer-implemented method of claim 1, wherein accessing, by the security program, the settings portal for the user account in response to receiving the instruction to anonymize the user account comprises logging into the user account.

8. The computer-implemented method of claim 7, wherein the security program references a login credential stored within the protected vault to login to the user account.

9. The computer-implemented method of claim 1, further comprising the security program generating the anonymized values.

10. The computer-implemented method of claim 9, wherein the security program generates the anonymized values in response to receiving the instruction to anonymize the user account.

11. A system for anonymizing user accounts, the system comprising:
a reception module, stored in memory, that receives an instruction to anonymize a user account to protect a user's personally identifiable information at least in part by receiving a streamlined single-click instruction to complete an entire process of anonymizing the user account;

an accessing module, stored in memory, that accesses, as part of a security program, in response to receiving the streamlined single-click instruction to complete the entire process of anonymizing the user account, a settings portal for the user account at least in part by the security program autonomously navigating to a website for the settings portal for the user account and the security program using credentials to login to the user account at the website, the security program comprising a third-party security program that is distinct from a specific service that includes the user account;

a replacement module, stored in memory, that replaces, as part of the security program, in response to receiving the streamlined single-click instruction to complete the entire process of anonymizing the user account, original values within at least two fields within the settings portal for the user account with anonymized values to mask the user's personally identifiable information;

a storing module, stored in memory, that stores the anonymized values within a protected vault to enable the user to login to the user account;

wherein the security program accesses the settings portal for the user account at least in part by referencing a predefined template that informs the security program about how to navigate to the website and how to parse the at least two fields of the website; and at least one physical processor configured to execute the reception module, the accessing module, the replacement module, and the storing module.

12. The system of claim 11, wherein the personally identifiable information comprises at least two of:
   a username;
   a password;
   a name;
   a credit card number; and
   an address.

13. The system of claim 11, wherein the original values comprise a blank value.

14. The system of claim 11, wherein the original values comprise a default value.

15. The system of claim 11, wherein the original values comprise a value originally set by the user upon registering the user account.

16. The system of claim 11, wherein the replacement module replaces, as part of the security program, an original value for a third field within the settings portal for the user account.

17. The system of claim 11, wherein the accessing module accesses, as part of the security program, the settings portal for the user account in response to receiving the instruction to anonymize the user account by logging into the user account.

18. The system of claim 17, wherein the security program references a login credential stored within the protected vault to login to the user account.

19. The system of claim 11, wherein the security program is further configured to generate the anonymized values.

20. A non-transitory computer-readable medium comprising one or more computer-readable instructions that, when executed by at least one processor of a computing device, cause the computing device to:
   receive an instruction to anonymize a user account to protect a user's personally identifiable information at least in part by receiving a streamlined single-click instruction to complete an entire process of anonymizing the user account;
   access, by a security program in response to receiving the streamlined single-click instruction to complete the entire process of anonymizing the user account, a settings portal for the user account at least in part by the security program autonomously navigating to a website for the settings portal for the user account and the security program using credentials to login to the user account at the website, the security program comprising a third-party security program that is distinct from a specific service that includes the user account;
   replace, by the security program in response to receiving the streamlined single-click instruction to complete the entire process of anonymizing the user account, original values within at least two fields within the settings portal for the user account with anonymized values to mask the user's personally identifiable information; and
   store the anonymized values within a protected vault to enable the user to login to the user account,
   wherein the security program access the settings portal for the user account at least in part by referencing a predefine template that informs the security program about how to navigate to the website and how to parse the at least two fields of the website.

\* \* \* \* \*